Aug. 15, 1967     E. B. CRISMAN     3,335,871
TIRE DISPLAY RACK
Filed May 7, 1965
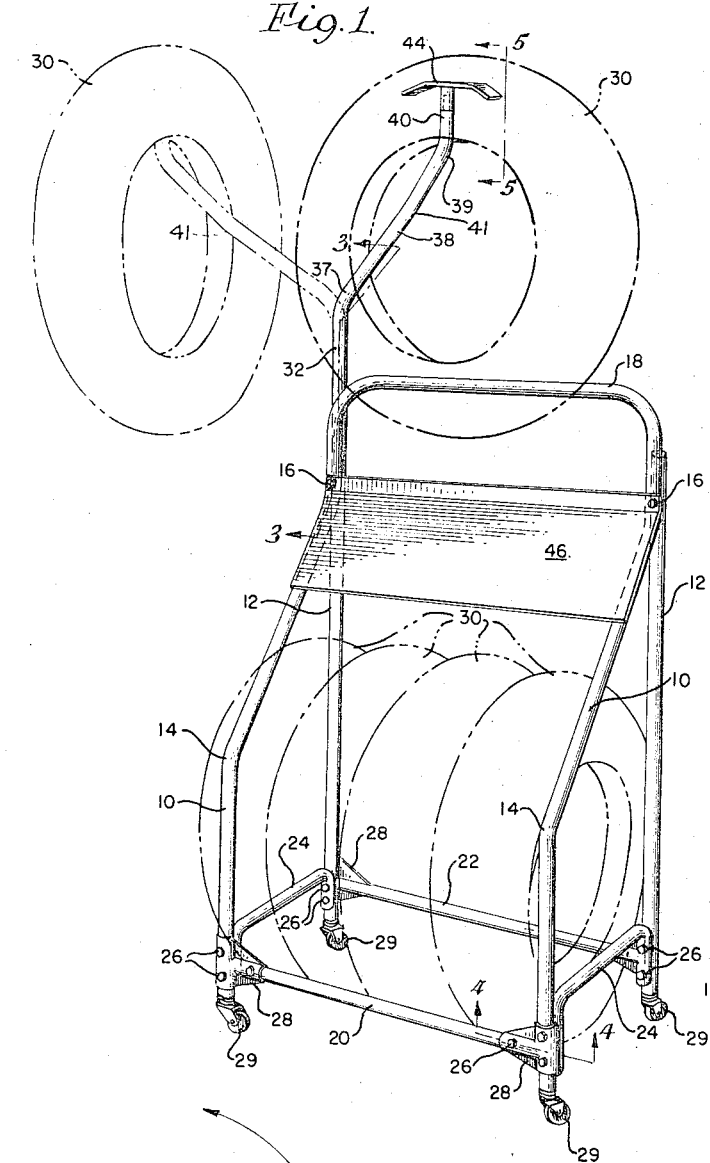
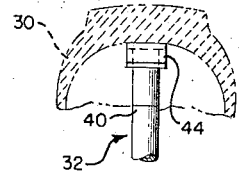
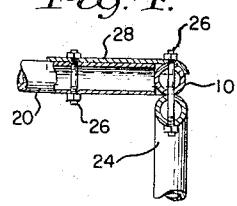
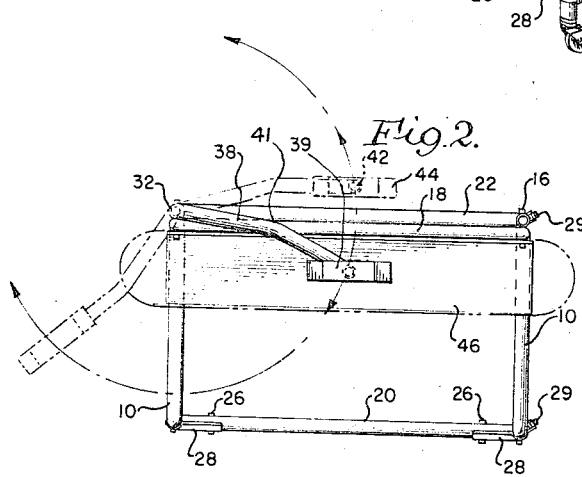
INVENTOR.
EDWIN B. CRISMAN
BY
Bean, Brooks, Buckley & Bean
ATTORNEYS

United States Patent Office 3,335,871
Patented Aug. 15, 1967

3,335,871
TIRE DISPLAY RACK
Edwin B. Crisman, 22 Gilbert Ave.,
Blasdell, N.Y. 14219
Filed May 7, 1965, Ser. No. 454,084
2 Claims. (Cl. 211—24)

ABSTRACT OF THE DISCLOSURE

A tire display post associated with a display stand in cooperative relation with a fastener element joining certain portions of the display stand and adapted to supplement the display characteristics of the stand itself by supporting a tire in elevated relation to the stand.

---

This invention relates to display devices for automotive vehicle tires or the like; and more particularly to a display device of the rack type, adapted to support a plurality of tires on display in a showroom or the like.

It is one object of the present invention to provide a tire display rack as aforesaid which conveniently holds a plurality of tires in side-by-side relation, and which also supports a tire at vertically elevated position on a swivel device whereby the elevated tire may be swung about a vertical axis to facilitate viewing and handling access to all parts of the tire by prospective customers and salesman or the like.

Another object of the invention is to provide an improved display device as aforesaid which is of structurally simple and rugged form; inexpensive to manufacture and assemble; and advantageous in use because of the minimum space it occupies.

Other objects and advantages of the invention will appear from the specification herein and the accompanying drawings, wherein:

FIG. 1 is a perspective view of a tire display device of the invention, showing alternatively by means of solid and broken lines, various positions of the elevated tire support swivel device;

FIG. 2 is a top plan view of the device of FIG. 1;

FIG. 3 is an enlarged scale fragmentary sectional view taken as suggested by line 3—3 of FIG. 1; and FIGS. 4, 5, are enlarged scale fragmentary sectional views taken as suggested by lines 4—4 and 5—5, respectively, of FIG. 1.

As shown by way of example in the drawing herewith, the invention may be embodied in a tire display stand fabricated essentially of tubular metal stock to comprise a main frame including front legs 10—10 and rear legs 12—12. The front legs are bent as indicated at 14—14 so that the upper portions thereof incline upwardly and rearwardly into connections with the rear legs 12—12 as indicated at 16, 16. A top crossbar portion for the frame as shown at 18 is conveniently provided by forming the two front legs and the crossbar portion 18 from a single length of tubing, which is easily bent into the form illustrated herein. At their lower ends the legs are cross-braced as by means of front and rear rails 20, 22, and by side rails 24, 24; the parts being interconnected as by means of bolts 26. Preferably, bracket plates 28 are employed at these connection points to rigidify the right-angular relationships of the connected parts. Casters as indicated at 29 are preferably mounted in the bottom of each leg. Thus, it will be appreciated that the main frame portion of the device is of open rectangular box form, whereby a plurality of tires as indicated at 30, may be slip-fitted into the rack so as to stand uprightly therein, in side-by-side relation; the tires being vertically supported by the rails 20, 22. Thus, the tires may easily be rolled into and out of the device incidental to handling by salesmen, prospective customers, and the like.

To support a tire at an elevated level (approximately at the eye level of a prospective customer), I provide a swivel post as designated at 32 in the drawing herewith, mounted as a swivelable vertical extension of one of the back legs 12. As shown in FIG. 3, this purpose may be readily accomplished by mounting interiorly of the back leg 12 a pivot pin 34; the latter being diametrically dimensioned so as to firmly slip-fit at its lower end into the back leg 12 until it rests upon the connecting bolt 16, thereby gaining a firm purchase on the leg. The pin 34 is lengthwise dimensioned so as to extend vertically above the upper end of the leg 12, whereby it will be appreciated that the swivel post 32 may be simply slip-fitted at its lower end downwardly around the pivot pin 34 until it abuts at its lower end against the upper end of the rear leg 12, as indicated at 36 (FIG. 3).

The swivel post 32 is bent as indicated at 37 so as to include a leg portion 38 inclining away from the vertical swivel axis, and is then preferably bent again as indicated at 39, so as to terminate in a vertically extending top end portion 40. Also, the leg portion 38 is laterally bent as indicated at 41. A pivot pin 42 is mounted in the upper end of the post portion 40 so as to mount in freely swivelable relation thereon a tire support shoe 44. The shoe 44 is thereby adapted to reach upwardly inside the tire and to bear against the inside surface of the tread portion of the tire when the latter is mounted on the device as suggested by the broken line showings of FIGS. 1, 5.

Thus, it will be understood that whereas the swivel post may normally be disposed as indicated by its solid line showings in FIGS. 1, 2, and standing so as to display the elevated tire in side view, the persons wishing to examine the tire may easily swing it around on the lower pivotal connection of the swivel post to the main rack so as to dispose the displayed tire to stand at right angles to its original position and to extend somewhat forwardly of the main frame. Furthermore, at any position of the swivel post and of the elevated tire, it may be locally swiveled within certain limits relative to the swivel post per se, by virtue of the swivel connection between the shoe 44 and the swivel post itself. Hence, it will be appreciated that the rack of the invention provides for ready display of the elevated tire at any of a large variety of desired angles, whereby the features of the tire wall and tread constructions may be studied and discussed with improved facility. It will be noted that the main frame portion of the device carries within its lower level a relatively heavy load of side-by-side disposed tires, and that the weight of this display assists to firmly stabilize the rack device against any possible tipping such as in event the elevated tire might be inadvertently swung violently about its swivel mounting. As indicated at 46, a sheet metal apron may be affixed to span the upper portion of the front leg structure thereby providing a convenient sign panel or "copy board" facing personnel viewing the device.

It will of course be understood that although only one specific form of the invention has been illustrated and described in detail hereinabove, various changes may be made therein without departing from the spirit of the invention or the scope of the following claims.

I claim:
1. A tire display device comprising, in combination,
a pair of upstanding tubular rear legs,
a pair of front legs extending from their bottom ends first upwardly and then rearwardly to the upper ends of said rear legs,
an inverted U-shaped crossbar portion joining the upper ends of said front legs, front, rear and side rails joining said legs adjacent their lower ends and forming a rack for receiving tires on display,
a fastener projecting through said crossbar portion and the respective upper ends of said rear legs and joining the front and rear legs thereby, said fasteners extending through said rear legs below the upper terminals thereof,
a pivot pin received in the upper end of one of said rear legs and resting upon a corresponding fastener to project upwardly beyond said one rear leg,
a tubular post having its lower end pivotally receiving the upper end of said pivot pin,
and a tire support shoe carried by the upper end of said post.

2. The tire display device as defined in claim 6 wherein said post is provided with an upper end carrying said shoe and which upper end is laterally offset with respect to the lower end of the post.

References Cited

UNITED STATES PATENTS

| | | | |
|---|---|---|---|
| 1,286,241 | 12/1918 | Crowl | 248—283 |
| 1,810,345 | 6/1931 | Collins | 211—23 |
| 1,865,298 | 6/1932 | Beach | 211—23 |
| 3,215,482 | 11/1965 | Litke | 248—282 X |

ROY D. FRAZIER, *Primary Examiner.*

CHANCELLOR E. HARRIS, *Examiner.*

F. DOMOTOR, *Assistant Examiner.*